United States Patent
Landgraf et al.

(10) Patent No.: US 6,343,329 B1
(45) Date of Patent: Jan. 29, 2002

(54) TELECOMMUNICATION SYSTEM AND METHOD FOR EXCHANGING INFORMATION BETWEEN AN E-MAIL SERVICE AND A SUBSCRIBER IN A TELECOMMUNICATION NETWORK

(75) Inventors: Rainer Landgraf, Buchloe; Manfred Reich, Grossinzemoos, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/217,422

(22) Filed: Dec. 21, 1998

(30) Foreign Application Priority Data

Dec. 19, 1997 (DE) .......................................... 197 56 852

(51) Int. Cl.[7] .............................................. G06F 15/16
(52) U.S. Cl. ........................ 709/246; 709/206; 455/413
(58) Field of Search ................................ 709/206, 246; 370/428; 379/67, 88.13, 88.14; 455/414, 413, 557

(56) References Cited

U.S. PATENT DOCUMENTS

| | | | | |
|---|---|---|---|---|
| 5,475,738 A | * | 12/1995 | Penzias | 379/67 |
| 5,737,395 A | * | 4/1998 | Irribarren | 379/88.13 |
| 5,950,123 A | * | 9/1999 | Schwelb et al. | 455/414 |
| 5,987,100 A | * | 11/1999 | Fortman et al. | 379/88.14 |
| 6,014,559 A | * | 1/2000 | Amin | 455/413 |
| 6,055,240 A | * | 4/2000 | Tunnicliffe | 370/428 |
| 6,061,718 A | * | 5/2000 | Nelson | 709/206 |
| 6,138,036 A | * | 10/2000 | O'Cinneide | 455/557 |

* cited by examiner

Primary Examiner—Zarni Maung
Assistant Examiner—Patrice Winder
(74) Attorney, Agent, or Firm—Schiff Hardin & Waite

(57) ABSTRACT

In a method for communicating information from e-mails which are intended for a subscriber of a telecommunication network and are filed in an e-mail service, subsequent to the activation of a corresponding service, e-mail messages arriving in the e-mail service for the subscriber are at least partially converted into speech, forwarded to a voice mail service and loaded there as a spoken message. In a suitable telecommunication system, an e-mail/voice mail converter is provided, which is arranged for the at least partial conversion of e-mail messages into speech and/or speech into digital written form, a control logic being provided for the actuation of the converter by comma nd messages of a subscriber.

1 Claim, 1 Drawing Sheet

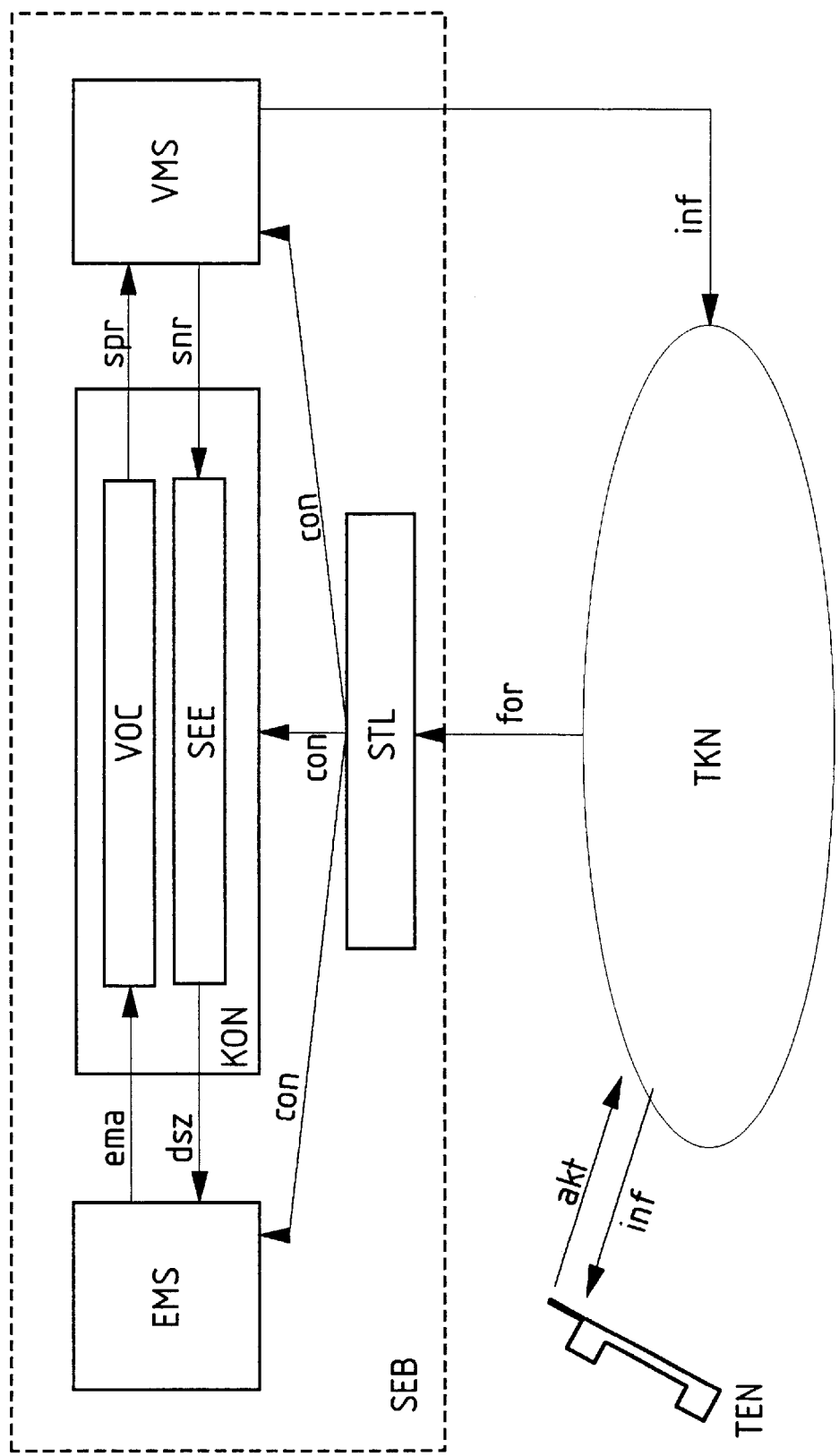

TELECOMMUNICATION SYSTEM AND METHOD FOR EXCHANGING INFORMATION BETWEEN AN E-MAIL SERVICE AND A SUBSCRIBER IN A TELECOMMUNICATION NETWORK

BACKGROUND OF THE INVENTION

1. Field of the Invention

The present invention relates to a method for transmitting information from e-mail messages which are intended for a subscriber of a telecommunication network and which are filed in an e-mail service, and to a method for transmitting messages or information of a subscriber of a telecommunication network to an e-mail service, and finally to a telecommunication system with at least one network, particularly a mobile radio network with an e-mail service for the reception and loading of e-mail messages and with a voice mail service for the reception and loading of voice mail messages.

2. Description of the Related Art

E-mail (electronic mail) services are known and are available in many networks. A subscriber of the network can usually access such services via a modem and a PC (personal computer). After connecting to a server, for example, the subscriber obtains the indication that there are e-mail messages for stored on the server which are addressed to the subscriber. The messages can then be retrieved to the subscriber's PC and read on the computer monitor or printed.

Often —on trips, for example—only a mobile radio device, such as a cellular telephone, for speech services is available to a network subscriber, so that e-mail messages that have been loaded in an e-mail service for the subscriber cannot be retrieved or read out. In the conventional communication networks of today, particularly in mobile radio networks, a voice mail service in which spoken messages of other subscribers are filed, in what is typically called a voice mailbox, is usually available.

To a limited extent, in SMS services (Short Message Service) which are set up in mobile radio networks, messages can also be forwarded to the subscriber in alphanumeric form even when a PC is not available. The limitation in the message length is service-specific, for example, a limit of 160 characters may be imposed, on the one hand, and the length may also limited by the size of the conventional display in mobile radio devices, on the other hand.

SUMMARY OF THE INVENTION

It is an object of the present invention to enable a subscriber to access e-mail messages even when output or display of the messages in written form is permanently or temporarily not possible.

This and other objects are inventively achieved in a method for transmitting information from an e-mail message which is intended for a subscriber of a telecommunication network and filed in an e-mail service in that, subsequent to the activation of a corresponding service, messages arriving in the e-mail service for the subscriber are at least partially converted into speech, forwarded to a voice mail service, and loaded there as a spoken message.

With the aid of the invention, a subscriber to whom a PC is not available can still access e-mail messages, even if the messages are extensive, if he or she is travelling with a mobile telephone, for example. Since the e-mail messages are loaded in the voice mail service, i.e. in the voice mailbox, given an activated mobile radio device, the subscriber sees on the display of the mobile radio device that there are voice mail messages present, which can then be retrieved. Thus, on the one hand, the conventional, actual spoken messages of remote subscribers, and on the other hand, e-mail messages that have been converted into speech, either in their entirety or parts of such messages, are available via this voice mailbox.

It is advantageous if the service can be activated from the subscriber side by the creation and transmission of an activation message and subsequently configuring of the email service, since the subscriber thereby has a random access to such a service, which is typically a toll service. In this respect, it is also appropriate if the service can be deactivated on the subscriber side by the creation and transmission of a deactivation message.

It is also advantageous if information is sent to the subscriber on the voice mail service side when there are messages stored in the voice mail service which are superfluous due to specific inquiries, conditions or instructions of the subscriber.

Another selection option of the subscriber, and also a way to avoid undesirable e-mails, can be achieved if the service is activated, or respectively, deactivated only for e-mails with prescribed features, e.g. the messages is activated only for e-mail messages from a predetermined sender address. Such features can be advantageously prescribed from the subscriber side in the activation message.

It is another object of the invention to give the subscriber an opportunity to feed messages into an e-mail service although the usual means required for this, in particular a PC, are not present.

To achieve these and other objects, the invention proceeds from a method for transmitting messages or information of a subscriber of a telecommunication network to an e-mail service, in which method, subsequent to the activation of a corresponding service, information spoken on the subscriber side is inventively converted into digital written form using speech recognition, is forwarded to the e-mail service, and is loaded there as stored information.

In this way, the subscriber can input by speech e-mail messages for transmittal to other subscribers who are accessible at specific e-mail addresses, and these messages can then be displayed, or respectively, printed out in written form at the destination point at the remote subscriber.

In order to give the subscriber greater freedom of choice, it is advantageous if the service is activated from the subscriber side by the generation and transmission of an activation message and the subsequent configuring of the voice mail, or respectively, e-mail service. It is also recommended that the service be deactivated from the subscriber side by the generation and transmission of a deactivation message, since this toll service is not always needed.

Convenience is increased for the subscriber if an item of information is sent to the e-mail addressees on the e-mail service side as soon as there are messages present. Also, for better information of the subscriber, the current status of the service should be conveyed to the subscriber via a status message subsequent to the subscriber's query.

The inventive method is particularly recommended if the telecommunication network is a mobile radio network, although it can also be used in purely stationary networks, such as regular telephone system.

The stated objects are also achieved with a telecommunication network, particularly a mobile radio network, with an e-mail service for the reception and loading of e-mail messages and with a voice mail service for the reception and loading of voice mail messages in which network an e-mail/ voice mail converter is provided, which is arranged for at least partial conversion of e-mail messages into speech and/or of speech into digital written form, and in which a control logic unit is provided for the actuation of the converter by command messages of a subscriber.

The advantages that can be achieved with such a telecommunication network have already been detailed in connection with the discussion of the method.

It is appropriate if the converter has a vocoder, or voice coder, which is controlled on the e-mail service side, or respectively, if the converter has a speech recognition unit for speech which arrives at a subscriber side or at a voice mail service side.

BRIEF DESCRIPTION OF THE DRAWINGS

The present invention, along with its further advantages, is detailed below with the aid of an exemplifying embodiment and is illustrated in the drawing.

FIG. 1 is a block diagram which depicts a telecommunication center with a mobile radio network and a service center.

DETAILED DESCRIPTION OF THE PREFERRED EMBODIMENTS

In the present example, the telecommunication network TKN is a mobile radio network such as a GSM (Global System for Mobile Communication) network or a cellular telephone network, although the invention can be used identically in stationary networks. A service area SEB is allocated to the network TKN, whereby it is not important for the essence of the invention if this service area forms a part of the network or is contained in another network, perhaps an intelligent network, for example. The service area can ultimately be operated by someone who is not a network user himself/herself.

The service area SEB contains an e-mail service EMS and a voice mail service VMS, whereby the latter is often referred to as a voice mailbox. A converter KON which has a vocoder VOC for the generation of speech from e-mail messages is provided according to the invention. The converter KON can additionally have a speech recognition unit SEE, also, for the conversion of speech into digital characters intended for the e-mail service.

A control logic unit STL serves for the controlling of the aforementioned units and also takes over the respectively desired configuring, according to corresponding activation messages of a subscriber TEN, for example, which is symbolized as a mobile radio device in the Figure.

By means of a corresponding input to the subscriber's mobile radio device—e.g. via an SMS service (Short Message Service) or some other service of an intelligent network—the subscriber TEN can trigger a conversion, via the converter KON, of e-mail messages which are directed to the subscriber and which are present in the e-mail service EMS into speech and the subsequent loading of the converted messages into the voice mail center. As in a conventional voice mail system, the subscriber is informed that a message is present with the known means of the voice mail service.

In the conversion of the e-mail messages into speech, care must be taken that only convertible e-mail contents pass through the conversion. Non-convertible contents such as encoded binary files (drawings, etc.) must definitely be recognized and exempted from speech conversion, since voice conversion of encoded files is, of course, not possible. In such a case, an indication of the presence of non-convertible parts of the e-mail can be generated and added to the message that has been converted and filed in the voice mail service.

An exemplary sequence is as follows: the subscriber activates the corresponding service by transmitting an activation message akt from the mobile radio device to the mobile radio network TKN, and this message akt is forwarded as a forwarding signal for to an application of the control logic unit STL, via what is known as a short message service center, for example.

Subsequent to the evaluation of this message in the control logic STL, the required configuration messages CON are sent to the e-mail service EMS, the converter KON and the voice mail service VMS.

Now the e-mail service EMS is configured such that incoming e-mail messages which are intended for the subscriber TEN are automatically forwarded to the converter KON as e-mail ema. The converter KON converts the e-mail message into a spoken message spr and forwards it to the voice mail server VMS, in which it is stored. An item of information inf is further generated and forwarded to the subscriber TEN via the mobile radio network TKN, the subscriber obtaining the indication that there are voice mail messages (in the subscriber's "mailbox") for him/her on the display of his/her mobile radio device. The subscriber can now reach the voice mail service VMS and retrieve the information in the usual way by selecting a call number, usually a short number.

To protect against a flood of converted e-mail messages, in the activation of the service the subscriber can specify that, for example, only certain e-mail messages are converted and stored in the voice mail service VMS. Such parameters for limiting the service can be contained in the activation message akt and can relate to sender addresses of the e-mail messages, in particular.

It is of course also provided that the subscriber can deactivate the service, whereby the sequence is the same as in the service activation, accordingly. It can also be provided here that the activation occurs only in limited fashion, potentially for individual sender addresses.

Besides the indication of the aforementioned options with respect to a limiting of the service, the current status of the service in the sense of active/inactive can also be communicated to the subscriber TEN and displayed at his/her terminal.

In most cases, the filing of converted e-mail messages in the voice mail service brings a substantial increase in convenience for subscribers who, for a variety of reasons, do not have the opportunity to retrieve e-mail messages in the conventional form. It is also possible, however, to provide an additional service which converts spoken information of the subscriber into digital written form according to speech recognition, forwards it to the e-mail service and makes it available there as stored information for third parties. According to the depiction in the drawing, the converter KON contains a speech recognition unit SEE for this purpose, to which speech messages snr of the subscriber are fed, potentially via the voice mail service, as shown here. The speech recognition unit SEE converts the received speech message snr into digital written characters dsz and forwards this to the e-mail service EMS, and the message is filed there as a conventional e-mail message. It is understood that the speech message can also be conducted directly from the mobile radio network or telecommunication network TKN to the converter KON, or respectively, to the speech recognition unit SEE.

Finally, it is once again noted that the e-mail service EMS, the converter KON with the vocoder VOC and the speech recognition unit SEE, the voice mail service VMS, and the control logic unit STL can form a physical unit, though this is not required. The units can also be implemented separately, and each service can have its own control logic.

Although other modifications and changes may be suggested by those skilled in the art, it is the intention of the inventor to embody within the patent warranted hereon all changes and modifications as reasonably and properly come within the scope of their contribution to the art.

We claim:

1. A method for transmitting information from e-mails which are intended for a subscriber of a telecommunication network and are filed in an e-mail service, comprising:

subsequent to activation of a transmitting service, at least partially converting a message arriving for the subscriber at the e-mail service into speech;

forwarding the message converted into speech to a voice mail service;

making available the message converted into speech as a spoken message at the voice mail service;

activating the transmitting service only for e-mails with predetermined features; and activating the transmitting service from a subscriber side of the telecommunications network by generation and transmission of an activation message and subsequent configuring of the e-mail service, and wherein said predetermined features are specified from a subscriber side in the activation message.

* * * * *